US012609882B2

(12) United States Patent
Sen et al.

(10) Patent No.: US 12,609,882 B2
(45) Date of Patent: Apr. 21, 2026

(54) NETWORK TESTING SYSTEM AND METHOD OF USING

(71) Applicant: RAKUTEN SYMPHONY, INC., Tokyo (JP)

(72) Inventors: Nayan Sen, Bangalore (IN); Sandeep Bagchi, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 482 days.

(21) Appl. No.: 18/185,824

(22) Filed: Mar. 17, 2023

(65) Prior Publication Data

US 2024/0314057 A1     Sep. 19, 2024

(51) Int. Cl.
H04L 43/50 (2022.01)
H04L 41/06 (2022.01)
H04L 41/5009 (2022.01)

(52) U.S. Cl.
CPC .............. H04L 43/50 (2013.01); H04L 41/06 (2013.01); H04L 41/5009 (2013.01)

(58) Field of Classification Search
CPC ...... H04L 43/50; H04L 41/06; H04L 41/5009
See application file for complete search history.

(56) References Cited

U.S. PATENT DOCUMENTS

2019/0020540 A1* 1/2019 Yen ..................... H04L 41/0876
2020/0033409 A1* 1/2020 Hobbs .............. G11C 29/56016
2020/0401504 A1* 12/2020 Sommers ............ G06F 11/3688
2021/0257007 A1* 8/2021 Kota ..................... G11C 7/1087
2022/0138081 A1* 5/2022 Varma ................. G06F 11/3684
717/124
2022/0140918 A1* 5/2022 Mellein .............. H04B 17/0085
370/252
2023/0152374 A1* 5/2023 Sauer ............... G01R 31/31908
714/724
2023/0224050 A1* 7/2023 Glover .................... H04L 43/50
370/241
2024/0027299 A1* 1/2024 Özvural .................. G01M 3/26
2024/0241817 A1* 7/2024 Tahvili .................. G06F 40/216
2024/0275711 A1* 8/2024 Jin .......................... H04L 41/22

* cited by examiner

*Primary Examiner* — Schquita D Goodwin

(74) *Attorney, Agent, or Firm* — HAUPTMAN HAM, LLP

(57) ABSTRACT

A network testing system includes a non-transitory computer readable medium configured to store instructions thereon; and a processor. The processor is configured to execute the instructions for retrieving a call graph; identifying decision branches within the call graph; and generating a valid request payload for each of the decision branches. The processor is configured to execute the instructions for generating an invalid request payload for each of the decision branches; instructing an orchestrator to test a device under test (DUT) using each of the valid request payload and the invalid request payload; comparing responses received from the DUT to each of the valid request payload and the invalid request payload with expected responses; and determining that the DUT includes a failure in response to a determination that any of the responses received from the DUT fail to match a corresponding expected response of the expected responses.

20 Claims, 7 Drawing Sheets

Fig. 5

500

505 — Retrieve simulation graph

510 — Analyze graph nodes that contribute to KPI measurement

515 — Trigger start of test

520 — Retrieve run history and calculate new rates to apply to nodes

525 — Receive statistics input from DUT

530 — Analyze statistic input and measure current performance

535 — Compare KPI with run history to determine if KPI is acceptable

540 — KPI acceptable ?

No

Yes

545 — Terminate test session

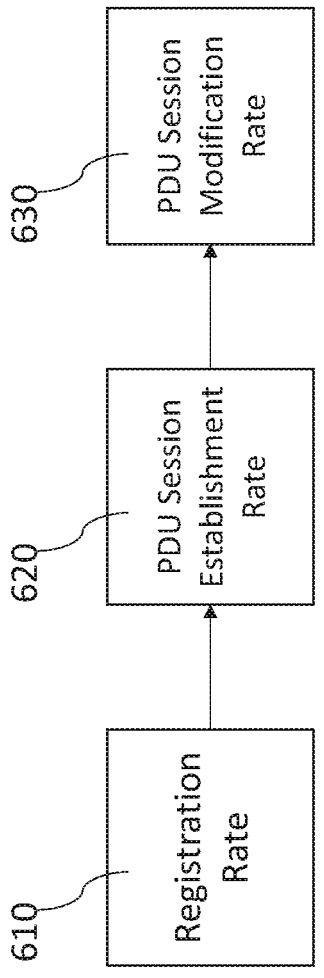
Fig. 6

704

707

706

716

718

720

722

Memory

Instructions

Call Graph

Run History

KPI

Payload

708

710

I/O

702

Processor

712

Network
Interface

714

Network

700

NETWORK TESTING SYSTEM AND METHOD OF USING

TECHNICAL FIELD

This description relates to a network testing system and a method of using a network testing system.

BACKGROUND

The third generation partnership project (3GPP) protocol includes hundreds of messages. Each of these messages includes multiple information elements (IEs). Each of the IEs, in turn, has multiple constraints related to optionality and data constraints. When a device, which is part of a network, is tested, the device is called a device under test (DUT) in some instances. During testing of the DUT, a call graph is used to test whether the DUT properly receives a message and properly responds to the message.

In a test scenario, the call graph includes conditional branches and termination conditions. In order to cause the DUT to experience messages that do outside of the results of the conditional branches, a user, such as a network manager, modifies inputs and causes the call graph to be re-run.

SUMMARY

A network testing system includes a non-transitory computer readable medium configured to store instructions thereon. The network testing system further includes a processor connected to the non-transitory computer readable medium. The processor is configured to execute the instructions for retrieving a call graph. The processor is configured to execute the instructions for identifying decision branches within the call graph. The processor is configured to execute the instructions for generating a valid request payload for each of the decision branches. The processor is configured to execute the instructions for generating an invalid request payload for each of the decision branches. The processor is configured to execute the instructions for instructing an orchestrator to test a device under test (DUT) using each of the valid request payload and the invalid request payload. The processor is configured to execute the instructions for comparing responses received from the DUT to each of the valid request payload and the invalid request payload with expected responses. The processor is configured to execute the instructions for determining that the DUT includes a failure in response to a determination that any of the responses received from the DUT fail to match a corresponding expected response of the expected responses.

A network testing method includes retrieving a call graph. The method further includes identifying decision branches within the call graph. The method further includes generating a valid request payload for each of the decision branches. The method further includes generating an invalid request payload for each of the decision branches. The method further includes instructing an orchestrator to test a device under test (DUT) using each of the valid request payload and the invalid request payload. The method further includes comparing responses received from the DUT to each of the valid request payload and the invalid request payload with expected responses. The method further includes determining that the DUT includes a failure in response to a determination that any of the responses received from the DUT fail to match a corresponding expected response of the expected responses.

A non-transitory computer readable medium configured to store instructions thereon. The instructions are configured to cause a processor to perform operations comprising retrieving a call graph. The instructions are configured to cause a processor to perform operations comprising identifying decision branches within the call graph. The instructions are configured to cause a processor to perform operations comprising generating a valid request payload for each of the decision branches. The instructions are configured to cause a processor to perform operations comprising generating an invalid request payload for each of the decision branches. The instructions are configured to cause a processor to perform operations comprising instructing an orchestrator to test a device under test (DUT) using each of the valid request payload and the invalid request payload. The instructions are configured to cause a processor to perform operations comprising comparing responses received from the DUT to each of the valid request payload and the invalid request payload with expected responses. The instructions are configured to cause a processor to perform operations comprising determining that the DUT includes a failure in response to a determination that any of the responses received from the DUT fail to match a corresponding expected response of the expected responses.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is a flowchart of a method of using a network testing system, in accordance with some embodiments.

FIG. 6 is a block diagram of measuring operation of a device under test (DUT), in accordance with some embodiments.

DETAILED DESCRIPTION

Figure 1:
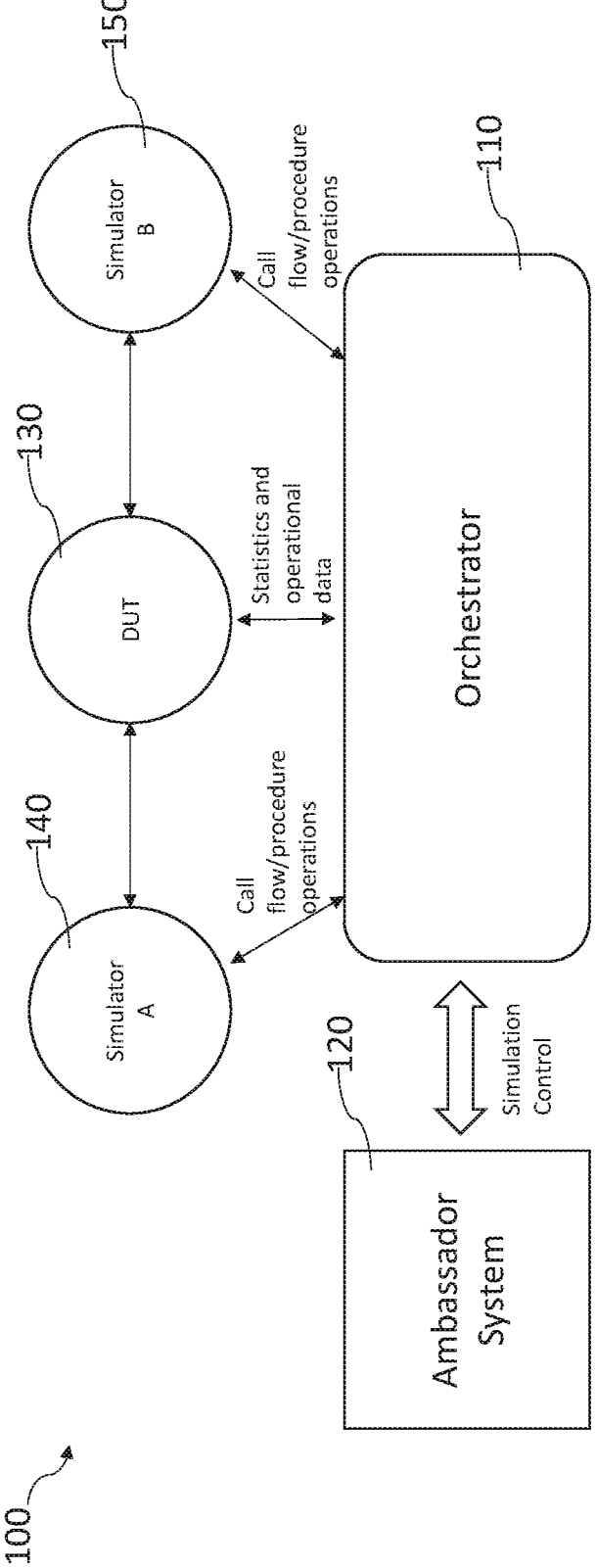
FIG. 1 is a schematic diagram of a network testing system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

There are several instances where a device within a network is tested to determine operability of the device. In some instances, the device under test (DUT) is tested because the DUT is newly added to the network, the DUT was upgraded, the DUT experienced a failure, the DUT experienced a power outage, preventative maintenance is performed on the network, or other suitable situations. A call graph is used to test the DUT. The call graph includes a plurality of nodes where payloads are generated for transmission to the DUT; and where responses from the DUT are compared with expected responses. The number of nodes within a call graph is large and many nodes within the call graph include multiple payload options as well as different informational elements (IEs) within the payloads. As a result, there is an enormous number of possible payloads and expected responses for testing the DUT.

In some instances, the testing of the DUT is performed by a user, such as a network manager, generating different payloads for transmission to the DUT. The network manager reviews the call graph and identifies nodes and possible payloads and generates payloads for testing the DUT. This type of process is time consuming and prone to errors. As a result, a risk of failing to test the DUT under a large number, or all, possible results for the call graph increases. In a situation where the DUT is not rigorously testing, a risk of the DUT failing and impacting performance of the network increases. Further, identifying the location of the network failure becomes more difficult because the DUT was considered to have passed the testing procedure.

In order to help more fully test the DUT, the current description includes an ambassador module that is able to retrieve call graphs for testing of the DUT. The ambassador module is able to analyze the call graph; generate payloads for success and failure at each node identified in the call graph; and compare expected responses with the responses received from the DUT. The use of the ambassador module helps to reduce the likelihood of errors during testing of the DUT. The ambassador module is also able to store information related to historical data associated with the DUT as well as communication protocols for communicating with the DUT. As a result, the testing of the DUT is more comprehensive, faster, and less prone to errors than other approaches which rely on a network manager.

In addition, the ambassador module is able to help determine communication rates with the DUT in order to determine a volume of communication that the DUT is able to handle with minimal risk of failure. In some instances, the ambassador module generates payloads for transmission at a first rate. The ambassador module analyzes key performance indicators (KPIs) of the DUT using responses received from the DUT. In response to the KPIs indicating satisfactory results, the ambassador module increases the payload transmission rate. In response to the KPIs indicating unsatisfactory results or failure to receive expected responses, the ambassador module decreases the payload transmission rate. The process is repeated in an iterative manner until the ambassador module is able to determine a fastest transmission rate that provides satisfactory KPI values without response failures. As a result, the ambassador module is able to improve the speed of communication within the network while helping to reduce the risk of failures within the network in comparison with other approaches.

FIG. 1 is a schematic diagram of a network testing system 100, in accordance with some embodiments. The network testing system 100 includes an orchestrator 110. The orchestrator 110 is configured to communicate with an ambassador system 120, also called an ambassador module. The ambassador system 120 and the orchestrator 110 exchange simulation control information to allow the orchestrator 110 to execute testing of a DUT 130. The orchestrator 110 is configured to receive statistical and operational data from the DUT 130. The orchestrator 110 is configured to provide instructions to a first simulator 140 and to a second simulator 150 for testing the DUT 130. The first simulator 140 and the second simulator 150 provide payloads to the DUT 130 and receive responses from the DUT 130 based on the payloads. The responses are then provided to the orchestrator 110 and communicated to the ambassador system 120 for analysis.

Figure 4:
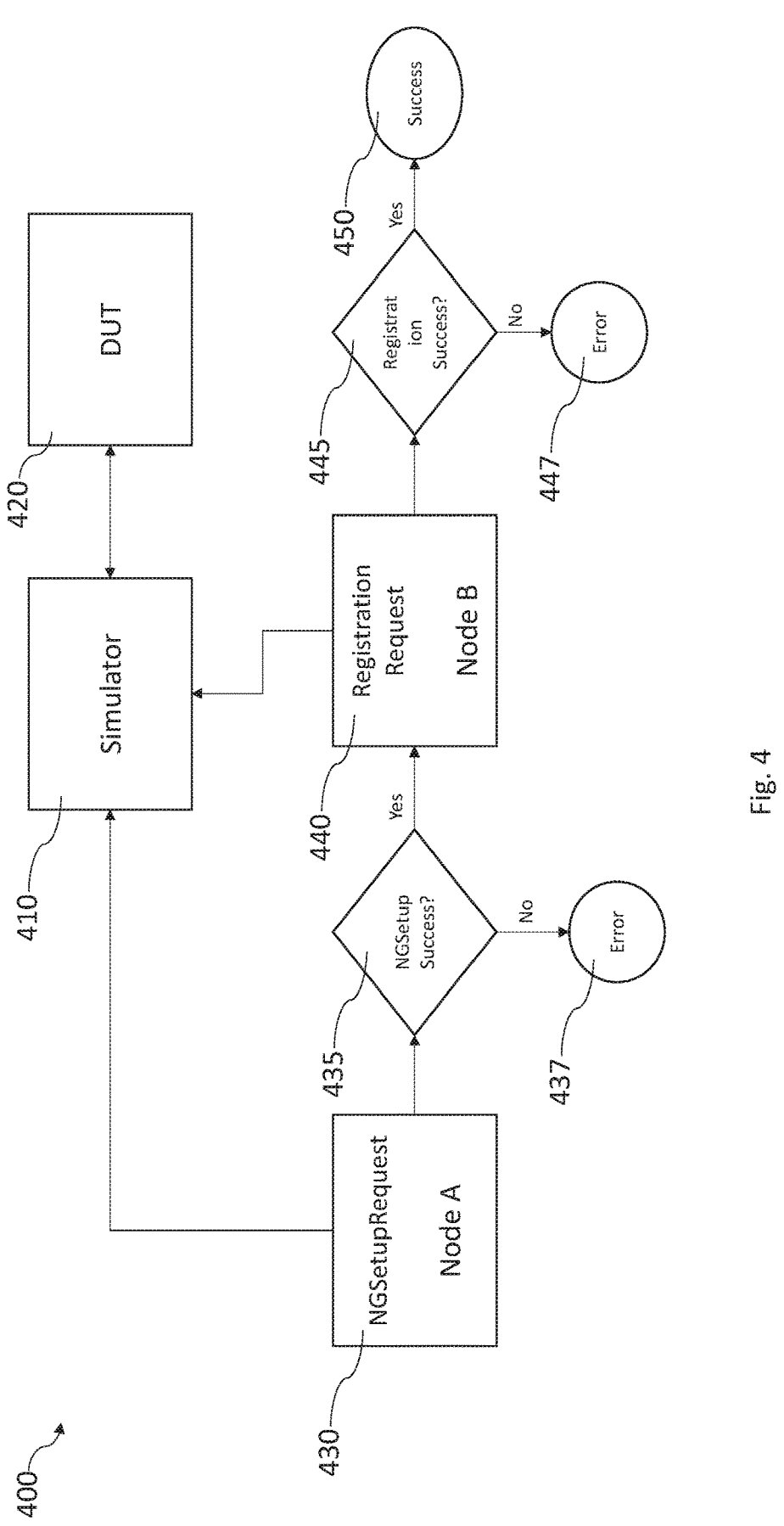
FIG. 4 is a flow diagram of a call graph usable for testing a network, in accordance with some embodiments.

The orchestrator 110 provides instructions to the first simulator 140 and the second simulator 150 based on a call graph, e.g., call graph 400 (FIG. 4). The orchestrator 110 uses an established protocol, such as 3GPP or another suitable protocol, for instructing the first simulator 140 and the second simulator 150. The orchestrator 110 instructs the first simulator 140 and the second simulator 150 which request from the protocol to provide to the DUT 130 and the IE for the payload corresponding to the request to provide to the DUT 130. The orchestrator 110 receives a response from the DUT 130 through the first simulator 140 or the second simulator 150 in response to the request and payload provided to the DUT 130. The orchestrator 110 provides the response to the ambassador system 120 for analysis.

In a system that does not include the ambassador system 120, the orchestrator 110 executes the call graph based on received instructions from a network manager. In a system that does not include the ambassador system 120, the orchestrator 110 has an increased risk of failing to test the DUT 130 using each possible outcome from the call graph. As a result, a risk of an undetected fault within the DUT 130 increases in comparison with the network testing system 100.

In some embodiments, the orchestrator 110 communicates with at least one of the ambassador system 120, the DUT 130, the first simulator 140, or the second simulator 150 wirelessly. In some embodiments, the orchestrator 110 communicates with at least one of the ambassador system 120, the DUT 130, the first simulator 140, or the second simulator 150 using a wired connection. While the network testing system 100 includes a single orchestrator 110, one of ordinary skill in the art would recognize that multiple orchestrators 110 are within the scope of this description.

The ambassador system 120 controls the orchestrator 110 to help ensure that all possibilities within a call graph are executed on the DUT 130. The ambassador system 120 receives a call graph, e.g., call graph 400 (FIG. 4), identifies the nodes within the call graph and generates payloads for each branch of the nodes within the call graph. The ambassador system 120 then provides the information to the orchestrator 110 to cause the orchestrator 110 to test the DUT 130 using the payloads generated by the ambassador system 120.

The ambassador system 120 received information regarding responses from the DUT 130 as well as statistical and operational data regarding the DUT 130 from the orchestrator 110. Using the received responses, the ambassador system 120 is able to determine whether the DUT 130 is functioning properly. Using the statistical and operational data regarding the DUT 130, the ambassador system 120 is able to determine KPIs for the DUT 130 in order to help improve communication speed using the DUT 130 once the DUT 130 is utilized in the network.

In some embodiments, the ambassador system 120 causes one or more nodes within the call graph to be repeatedly tested on the DUT 130 based on responses and/or statistical and operational data related to the DUT 130. In some embodiments, the ambassador system 120 is usable to tune communication with the DUT 130 in order to produce a fastest communication speed that is determined to be reliably stable. In some embodiments, reliably stable indicates that the DUT 130 produces expected responses to both valid and invalid payloads.

The DUT 130 is a network component being tested by the network testing system 100. In some embodiments, the DUT 130 is part of a base station. In some embodiments, the DUT 130 includes a radio unit (RU), an antenna, a distributed unit (DU), or another suitable component. In some embodiments, the DUT 130 is part of an open radio access network (O-RAN). The DUT 130 is configured to communicate within the network using a protocol, e.g., 3GPP protocol. In some embodiments, the DUT 130 is being newly added to the network and is undergoing testing prior to deployment. In some embodiments, the DUT 130 is being upgraded by either a software upgrade or hardware upgrade and is being tested to determine whether the upgrade was successful. In some embodiments, the DUT 130 is being tested as a result of a detected failure or fault within the DUT 130. In some embodiments, the DUT 130 is being tested during to preventative or scheduled maintenance of the network.

The first simulator 140 is configured to act like another component of the network that will communicate with the DUT 130 during normal operation in the network. The first simulator 140 is configured to receive instructions from the orchestrator 110 and provide payloads to the DUT 130 based on a communication protocol of the first simulator 140. The first simulator 140 is configured to receive responses from the DUT 130 based on the payloads provided to the DUT 130. The first simulator 140 is further configured to communicate the responses received from the DUT 130 to the orchestrator 110. In some embodiments, the first simulator 140 is configured to communicate with the DUT 130 wirelessly. In some embodiments, the first simulator 140 is configured to communicate with the DUT 130 using a wired connection. In some embodiments, the first simulator 140 is integrated into the orchestrator 110. In some embodiments, the first simulator 140 is a separate device from the orchestrator 110.

The second simulator 150 is configured to act like another component of the network that will communicate with the DUT 130 during normal operation in the network. The second simulator 150 is configured to receive instructions from the orchestrator 110 and provide payloads to the DUT 130 based on a communication protocol of the second simulator 150. The second simulator 150 is configured to receive responses from the DUT 130 based on the payloads provided to the DUT 130. The second simulator 150 is further configured to communicate the responses received from the DUT 130 to the orchestrator 110. In some embodiments, the second simulator 150 is configured to communicate with the DUT 130 wirelessly. In some embodiments, the second simulator 150 is configured to communicate with the DUT 130 using a wired connection. In some embodiments, the second simulator 150 is integrated into the orchestrator 110. In some embodiments, the second simulator 150 is a separate device from the orchestrator 110. In some embodiments, the communication protocol of the first simulator 140 is a same communication protocol as the second simulator 150. In some embodiments, the communication protocol of the first simulator 140 is different from the communication protocol of the second simulator 150. In some embodiments, the first simulator 140 is part of a same structure as the second simulator 150. In some embodiments, the first simulator 140 is a separate device from the second simulator 150. While the network testing system 100 includes two simulators, one of ordinary skill in the art would recognize that a system including a single simulator or more than two simulators are within the scope of this description.

In comparison with other approaches that do not include the ambassador system 120, the network testing system 100 is able to test a wider number of variations of requests to the DUT 130. In addition, the network testing system 100 reduces a likelihood of errors during the testing of the DUT 130 in order to help ensure proper functioning of the DUT 130 once deployed into operation within the network. The inclusion of the ambassador system 120 also helps with enhancing speed of communication with the DUT 130 while maintaining reliable stability of the DUT 130 once deployed in operation in the network.

Figure 2:
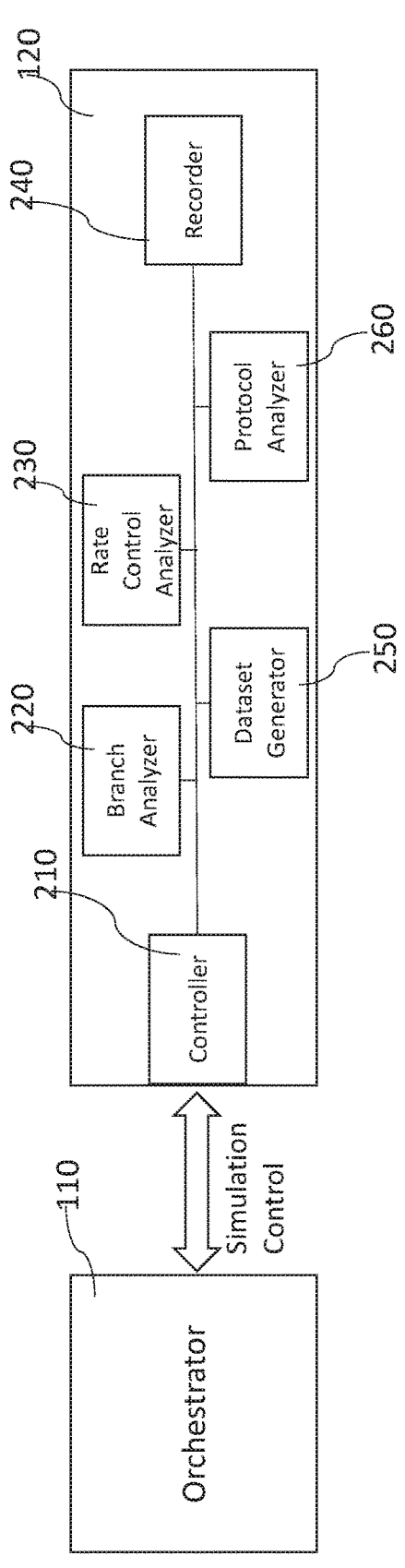
FIG. 2 is a schematic diagram of a portion of a network testing system in accordance with some embodiments.

FIG. 2 is a schematic diagram of a portion of a network testing system 200, in accordance with some embodiments. The network testing system 200 includes an orchestrator 110 in communication with an ambassador system 120. In some embodiments, the network testing system 200 is usable in the network testing system 100 (FIG. 1). In some embodiments, the network testing system 200 is usable in a network testing system other than the network testing system 100 (FIG. 1). In some embodiments, the orchestrator 110 communicates with the ambassador system 120 wirelessly. In some embodiments, the orchestrator 110 communicates with the ambassador system 120 via a wired connection. The orchestrator 110 is similar to the orchestrator 110 described above in the network testing system 100 (FIG. 1), and is not discussed here in detail for the sake of brevity.

In comparison with the network testing system 100 (FIG. 1), the ambassador system 120 of the network testing system 200 includes additional details for describing functionality and components of the ambassador system 120. The ambassador system 120 is usable in the network testing system 100 (FIG. 1). The ambassador system 120 includes a controller 210 configured to communicate with the orchestrator 110. The controller 210 is connected to a branch analyzer 220, a rate control analyzer 230, a recorder 240, a dataset generator 250 and a protocol analyzer 260. In some embodiments, each of the above components of the ambassador system 120 are housed within a single device. In some embodiments, at least one of the above components of the ambassador system 120 is housed in a different device from at least one other of the above components of the ambassador system 120. In some embodiments, the controller 210 is configured to communicate with each of the branch analyzer 220, the rate control analyzer 230, the recorder 240, the dataset generator 250 and the protocol analyzer 260 wirelessly. In some embodiments, the controller 210 is configured to communicate with at least one of the branch analyzer 220, the rate control analyzer 230, the recorder 240, the dataset generator 250 or the protocol analyzer 260 via a wired connection. While the network testing system 200 includes six components within the ambassador system 120, one of ordinary skill in the art would understand that more or less than six components are usable within the ambassador system 120 based on a designed functionality of the ambassador system 120.

The controller 210 is configured to control the working of the ambassador system 120. The controller 210 regulates the exchange of information amongst other components of the ambassador system 120. The controller 210 also facilitates communication with the orchestrator 110. The controller 210 is configured to provide a call graph to the orchestrator 110. The controller 210 is configured to provide data from each of the components of the ambassador system 120 to the orchestrator 110. The controller 210 is configured to receive information related to a configuration of a DUT. e.g., DUT 130 (FIG. 1), from the orchestrator 110. The controller 210 is also configured to receive information from the orchestrator 110 related to procedures currently being run by the orchestrator 110 as well as a status of those procedures. The controller 210 is further configured to receive statistics and operational data about the DUT from the orchestrator 110. The controller 210 is further configured to receive from the orchestrator 110, information related to responses from the DUT based on procedures run by the orchestrator 110. The controller 210 is further configured to provide instructions to the orchestrator 110 for terminating procedures run by the orchestrator 110; or a next step in a procedure run by the orchestrator 110. The controller 210 is further configured to provide a payload for a next request or rate of a next request to the orchestrator 110 for testing the DUT.

The branch analyzer 220 is configured to review a call graph and identify nodes, also called branching points, within the call graph. The branch analyzer 220 is queried by the controller 210 when a branching point within the call graph is reached by the orchestrator 110 during a testing of the DUT. The branch analyzer 220 retrieves past branches tested by the orchestrator 110 from the recorder 240. The branch analyzer 220 then decides which branch of the call graph the orchestrator 110 should test next. Once the next branch to be tested is determined, the branch analyzer 220 request the dataset generator 250 to generate a dataset to facilitate the testing of the branch. In some embodiments, the dataset to facilitate the testing of the branch includes a payload including a valid request to the DUT. In some embodiments, the dataset to facilitate the testing of the branch includes a payload including an invalid request to the DUT. In some embodiments, the dataset to facilitate the testing of the branch includes payloads for both a valid request and an invalid request. Using the branch analyzer 220, the ambassador system 120 helps to ensure that all branches of the call graph are used to test the DUT. Testing the DUT using all branches of the call graph makes the DUT less likely to fail during operation within the network.

The rate control analyzer 230 is usable to analyze statistical data from the orchestrator 110 for each of the branches used to test the DUT. The rate control analyzer 230 tracks the statistical data in relation with the branches of the call graph to determine whether the DUT is capable of a faster communication rate. The rate control analyzer 230 utilizes the determination to either increase or decrease the communication rate with the DUT. The rate control analyzer 230 is configured to set the key performance indicator (KPI), such as data rate, transmission rate, or another suitable KPI, for the communication with the DUT. For independent nodes, that is, nodes that are not impacted by the performance of other nodes, the rate control analyzer 230 is able to modify the KPI values for the node in order to help maximize communication speed with the DUT while maintaining reliable stability. For nodes that jointly impact the performance of the DUT, the rate control analyzer 230 attempts to find a Pareto optimum for the combination of nodes. One of ordinary skill in the art would understand that a Pareto optimum is a value for each node that provides the maximum communication rate without negatively impacting performance of other nodes executed by the DUT. Using the rate control analyzer 230 helps to improve the communication speed for the DUT when implemented in the network while maintaining reliable stability of the network.

The recorder 240 is a database configured to store all of the decisions, inputs and outputs of the ambassador system 120. The recorder 240 is also configured to store historical data across multiple test sessions for the DUT. The recorder 240 is also configured to provide test results for the DUT for one or more testing sessions for review by a network manager. In some embodiments, the recorder 240 includes storage devices in separate physical locations that are able to communicate in order to provide the data utilized by the ambassador system 120 during testing of the DUT.

The dataset generator 250 is configured to generate variations of payloads for testing branches within the call graph. The dataset generator 250 utilizes protocol level understanding of the payloads including mandatory, optional, conditionally optional, or other suitable value types in order to create the payloads. By utilizing protocol level understanding of the payloads, the dataset generator 250 is able to precisely develop payloads for testing the DUT. In other approaches that do not include the dataset generator 250 a risk of inadvertently generating an invalid request to the DUT is increased. The increased risk of an inadvertent invalid request increases the risk of a false negative during the testing of the DUT. A false negative result is difficult to reproduce and time consumption for analyzing a cause of the failure by the DUT increases. By utilizing the dataset generator 250, the ambassador system 120 is able to reduce false negatives and time for fully testing the DUT. The dataset generator 250 also generates variations of responses and stores datasets of expected responses from the DUT in order to help verify the functionality of the DUT based on information received from the orchestrator 110.

The protocol analyzer 260 is configured to provide protocol data to the dataset generator 250 to allow the dataset generator 250 to generate payloads that precisely correspond to the protocol utilized by the DUT. The protocol analyzer 260 also utilizes the protocol data to track requests and responses as well as statistics during the testing of the DUT. The protocol analyzer 260 tracks statistical fields received from the orchestrator 110 that correlate to parameters of the requests used to test the DUT. By tracking the statistical fields, the ambassador system 120 is able to achieve finer control of a rate of requests provided to the DUT in order to help maximize a reliably stable communication speed of the DUT when functioning within the network.

By utilizing the ambassador system 120, the network testing system 200 is able to efficiently and reliability test a DUT for all potential types of requests in a protocol. Also, because the ambassador system 120 is aware of the protocol utilized by the DUT, the ambassador system 120 is able to generate appropriate payloads for properly testing the DUT and reducing a risk of false negatives in comparison with other approaches that do not include the ambassador system 120.

Figure 3:
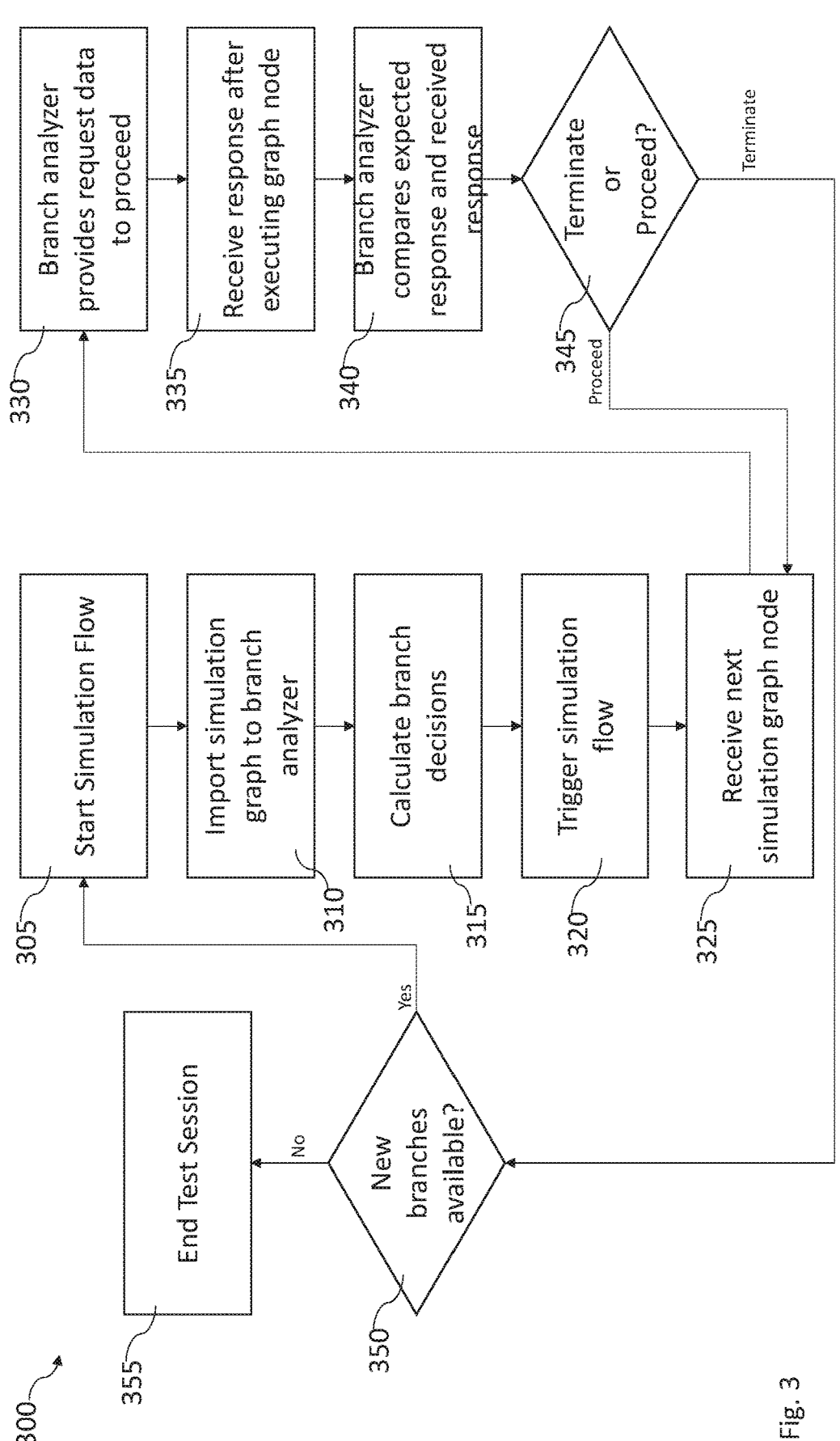
FIG. 3 is a flowchart of a method of using a network testing system, in accordance with some embodiments.

FIG. 3 is a flowchart of a method 300 of using a network testing system, in accordance with some embodiments. The method 300 is usable by a network testing system in order to help ensure than an entirety of a call graph is used to test a DUT. By utilizing the entirety of the call graph to test the DUT, the method 300 helps to ensure that the DUT functions properly in all situations following deployment into the network. In some embodiments, the method 300 is able to be executed by the network testing system 100 (FIG. 1) or the network testing system 200 (FIG. 2). In some embodiments, the method 300 is able to be executed by a network testing system other than the network testing system 100 (FIG. 1) or the network testing system 200 (FIG. 2).

In operation 305, a simulation flow is started. The simulation flow is started by an ambassador system, e.g., the ambassador system 120 (FIG. 1 or FIG. 2), receiving instructions for testing a DUT. In some embodiments, the instructions include a protocol utilized by the DUT. In some embodiments, the instructions include additional information related to the DUT, such as historical performance information.

In operation 310, a branch analyzer, e.g., branch analyzer 220 (FIG. 2) of the ambassador system imports a simulation graph for testing the DUT. The simulation graph is a call graph being used to test the DUT. In some embodiments, the branch analyzer imports the simulation graph from a recorder, e.g., recorder 240 (FIG. 2). In some embodiments, the branch analyzer received the simulation graph from a network manager. A simplified sample of a call graph usable as the simulation graph is discussed below with respect to FIG. 4.

In operation 315, the branch analyzer determines which points along the simulation graph include decisions. A decision is identified based on whether the DUT could receive a valid request or an invalid request and performance of a subsequent action by the DUT is based on whether the received request is valid or invalid. The branch analyzer locates each of the decision nodes within the simulation graph in order to help ensure that all potential branches of the simulation graph are used to test the DUT.

In operation 320, the simulation flow is triggered. The simulation flow is triggered by a controller, e.g., the controller 210 (FIG. 2), providing an instruction to an orchestrator, e.g., the orchestrator 110 (FIG. 1 or FIG. 2), to begin testing of the DUT. In some embodiments, the instruction includes a payload for the orchestrator to use as a request to send to the DUT. In some embodiments, the instruction includes the simulation graph to be used to test the DUT.

In operation 325, the orchestrator informs the ambassador system which node in the simulation graph is next to test the DUT. The orchestrator sends a message to the controller indicating which node will be next in the simulation graph.

In operation 330, the branch analyzer provides request data for testing the node identified in the operation 325. The branch analyzer utilizes a dataset generator, e.g., dataset generator 250 (FIG. 2), to generate both a valid request and an invalid response corresponding to the node identified in operation 325. The dataset generator uses the protocol of the DUT in order to generate the payloads for each of the valid request and the invalid request. The payloads are transmitted from the branch analyzer to the controller and then to the orchestrator to provide each of the valid request payload and the invalid request payload to the DUT. In some embodiments, the orchestrator utilizes one or more simulators, e.g., first simulator 140 (FIG. 1) or second simulator 150 (FIG. 1), to provide the payloads to the DUT.

In operation 335, the ambassador system received, from the orchestrator, responses generated by the DUT based on the payloads provided to the DUT in operation 330. In some embodiments, the responses from the DUT are provided directly to the orchestrator. In some embodiments, the responses are provided to the orchestrator through the one or more simulators.

In operation 340, the branch analyzer compares expected responses with the responses received in operation 335. The branch analyzer retrieves the expected responses from the recorder in order to perform the comparison. In response to a determination that the received response does not match the expected response, the ambassador system generates an alert, in some embodiments. In some embodiments, the alert is transmitted, either wirelessly or via a wired connection, to a terminal viewable by the network manager. In some embodiments, the alert includes an audio or visual alert. In some embodiments, the alert is stored in the recorder as a log for the performance of the DUT during the testing.

In operation 345, a determination is made regarding whether to continue with the testing of the DUT or terminate the testing of the DUT. The branch analyzer determines whether all branches of the simulation graph have been analyzed. In response to a determination that less than all of the branches of the simulation graph have been analyzed, a decision is made to proceed with the testing and the method 300 returns to operation 325 and a next node of the simulation graph is used to test the DUT. In response to a determination that all of the branches of the simulation graph have been analyzed, a decision is made to terminate the testing and the method 300 proceeds to operation 350.

In operation 350, a determination is made regarding whether any new branches of the simulation graph exist. The termination is made based on a comparison between a log of results for the testing of the DUT and the simulation graph. The branch analyzer determines whether the log results indicate that all branches of the simulation graph were used to test the DUT. In some embodiments, the branch analyzer queries the recorder to determine whether any updates to the simulation graph are available for further testing of the DUT. In some embodiments, the branch analyzer determines whether any additional communicate protocols are usable by the DUT; and a new simulation graph is retrieved for testing any additional communication protocol. In response to a determination that no new branches are available, the method 300 proceeds to operation 355. In response to a determination that at least one new branch is available, the method 300 returns to operation 305 in order to test the new branches.

In operation 355, the test session of the DUT is terminated. The ambassador system transmits an instruction to the orchestrator to cease testing of the DUT. In some embodiments, the ambassador system generates a report using log data from the testing of the DUT. In some embodiments, the report is provided to a network manager. In some embodiments, the ambassador system generates an alert in response to the report indicating any failure by the DUT during the testing. In some embodiments, the alert is similar to the alert discussed with respect to operation 340.

One of ordinary skill in the art would understand that additional operations are possible within method 300 in some embodiments. For example, in some embodiments, the method 300 further includes providing recommendations for resolution of any failures identified during the testing of the DUT. In some embodiments, an order of operations of the method 300 is changed. For example, in some embodiments the operation 315 is performed prior to the operation 310 and the simulation graph is received by the branch analyzer with decision branches already identified. In some embodiments, at least one operation of the method 300 is omitted. For example, in some embodiments, the operation 350 is omitted and the test session is ended upon a determination to terminate in operation 345.

Utilizing the method 300 helps to ensure that the DUT is tested under all possible request scenarios. As a result, the DUT is more likely to function as intended following deployment into the network in comparison with other approaches that fail to ensure testing of the DUT under all possible request scenarios.

FIG. 4 is a flow diagram of a call graph 400 usable for testing a network, in accordance with some embodiments. The call graph 400 is a simplified example of a call graph, or simulation graph, usable to test a DUT by a network testing system. In some embodiments, the call graph 400 is usable by the network testing system 100 (FIG. 1) or the network testing system 200 (FIG. 2). In some embodiments, the call graph 400 is usable by a network testing system other than the network testing system 100 (FIG. 1) or the network testing system 200 (FIG. 2). In some embodiments, the call graph 400 is usable in the method 300 (FIG. 3). In some embodiments, the call graph 400 is usable in a method other than the method 300 (FIG. 3).

The call graph 400 is executed by a simulator 410 communicating with a DUT 420. The simulator 410 receives request payloads from a first node 430 and from a second node 440 and transmits those requests to the DUT 420. The simulator 410 receives responses from the DUT 420 based on the provided request payloads. Based on the received responses, determinations are made in each of a first decision 435 and a second decision 445 regarding whether the received responses from the DUT 420 match expected responses.

The following description relates to an implementation of the call graph 400 in accordance with some embodiments. A branch analyzer, e.g., branch analyzer 220 (FIG. 2), analyzing the call graph 400 and identifies the first node 430 and the second node 440 as branching points or branch decisions, similar to operation 315 (FIG. 3). The first node 430 relates to a set up request. One of ordinary skill in the art would recognize that different types of requests for the first node 430 are within the scope of this description. For the first node 430, the branch analyzer consults with a protocol analyzer, e.g., protocol analyzer 260 (FIG. 2), to determine possible errors for a set up request based on the protocol utilized by the DUT 420. The branch analyzer then utilizes a dataset generator, e.g., dataset generator 250 (FIG. 2), to generate payloads for each of the possible errors for the set up request as well as a payload with a valid set up request.

The payloads are then provided to the DUT 420 using the simulator 410. Responses are received form the DUT 420 based on the payloads. The branch analyzer compares the received responses from the DUT 420 with expected responses. In response to a determination that the received responses match the expected responses, the branch analyzer proceeds to the second node 440. In response to a determination that at least one of the received responses fails to match the expected responses, the branch analyzer determines that the DUT 420 has an error and failed the test at the first node 430. In some embodiments, an alert, such as the alert described above, is generated in response to a determination that the DUT 420 has an error.

The second node 440 relates to a registration request. One of ordinary skill in the art would recognize that different types of requests for the second node 440 are within the scope of this description. For the second node 440, the branch analyzer consults with the protocol analyzer to determine possible errors for a registration request based on the protocol utilized by the DUT 420. The branch analyzer then utilizes the dataset generator to generate payloads for each of the possible errors for the registration request as well as a payload with a valid registration request.

The payloads are then provided to the DUT 420 using the simulator 410. Responses are received form the DUT 420 based on the payloads. The branch analyzer compares the received responses from the DUT 420 with expected responses. In response to a determination that the received responses match the expected responses, the branch analyzer determines that the DUT 420 functions as intended. In response to a determination that at least one of the received responses fails to match the expected responses, the branch analyzer determines that the DUT 420 has an error and failed the test at the second node 440. In some embodiments, an alert, such as the alert described above, is generated in response to a determination that the DUT 420 has an error.

A report generated based on the call graph 400 would include three potential outputs: failure at the first node 430; success at the first node 430 and failure at the second node 440; or success at the first node 430 and the second node 440. One of ordinary skill in the art would recognize that a call graph having more than two nodes is within the scope of this description.

FIG. 5 is a flowchart of a method 500 of using a network testing system, in accordance with some embodiments. The method 500 is usable by a network testing system in order to help improve a communication rate of a DUT once the DUT is deployed into the network. By determining a maximum communication rate of a DUT that maintains reliable stability, communication speed within a network is enhanced in comparison with approaches that fail to include maximize the communication rate or approaches that maximize the communication rate without consideration of stability. In some embodiments, the method 500 is able to be executed by the network testing system 100 (FIG. 1) or the network testing system 200 (FIG. 2). In some embodiments, the method 500 is able to be executed by a network testing system other than the network testing system 100 (FIG. 1) or the network testing system 200 (FIG. 2).

In operation 505, a simulation graph is retrieved. The operation 505 is similar to the operation 310 of the method 300 (FIG. 3) and is not discussed in detail for the sake of brevity.

In operation 510, the simulation graph is analyzed to determine which nodes within the simulation graph contribute to KPI measurement. The KPI measurement is a measure of communication rate of the DUT. In some embodiments, the KPI measurement includes transmission rate, data rate or another suitable KPI parameter. A rate control analyzer, e.g., rate control analyzer 230 (FIG. 2), analyzes the simulation graph and identifies independent nodes and related nodes. Independent nodes have KPI measurements that are not related to other nodes. Related nodes have KPI measurements that are impacted by KPI in other nodes. In some embodiments, the rate control analyzer determines the nodes within the simulation graph that contribute to KPI measurements based on stored statistical data, e.g., from the recorder 240 (FIG. 2).

In operation 515, the testing of the DUT is triggered. The operation 515 is similar to the operation 320 in the method 300 (FIG. 3) and is not discussed in detail for the sake of brevity.

In operation 520, the rate control analyzer retrieves run history for tests on the DUT and calculates new rates to apply to each of the nodes identified in operation 510. The rate control analyzer utilizes statistical and operation data from the recorder from previous testing of the DUT to determine a communication rate of the DUT utilized in the previous testing and whether the DUT performance was stable during the previous testing.

The following description of calculating new communication rates is applicable to independent nodes. In response to a determination that the DUT performance was stable with respect to a certain node, the rate control analyzer selects a faster communication rate for that node for subsequent testing. In response to a determination that the DUT performance was not stable with respect to a certain node, the rate control analyzer selects a slower communication rate for that node for subsequent testing.

The following description of calculating new communication rates is appliable to related nodes. In response to a determination that the DUT performance was stable with respect to each of the related nodes, the rate control analyzer selects a faster communication rate for one or more of the related nodes for subsequent testing. In some embodiments, the communication rate is only increased for a single node of the related nodes. In some embodiments, the communication rate is increased for less than all of the related nodes. In some embodiments, the communication rate is increased for all of the related nodes. In some embodiments, the rate control analyzer selects which nodes of the related node to increase communication rate based on analysis of statistical and operational data from prior testing of the DUT. In response to a determination that the DUT performance was no stable with respect to any of the related nodes, the rate control analyzer selects a slower communication rate for one or more of the related nodes for subsequent testing. In some embodiments, the communication rate is only deceased for a single node of the related nodes. In some embodiments, the communication rate is decreased for less than all of the related nodes. In some embodiments, the communication rate is decreased for all of the related nodes. In some embodiments, the rate control analyzer selects which nodes of the related node to decrease communication rate based on analysis of statistical and operational data from prior testing of the DUT. In some embodiments, the rate control analyzer attempts to determine a Pareto optimum for the related nodes.

The ambassador system provides instructions to the orchestrator for testing the DUT utilizing the new rates determined by the rate control analyzer.

In operation 525, the ambassador system receives statistics based on the performance of the DUT based on the new rates determined in operation 520. In some embodiments, the statistics from the DUT are provided directly to the orchestrator. In some embodiments, the statistics are provided to the orchestrator through the one or more simulators.

In operation 530, the statistics received in operation 525 is analyzed by the rate control analyzer to determine whether the DUT performed in a stable manner at the new communication rates. The rate control analyzer uses the statistics to generate KPI data for the DUT.

In operation 535, the KPI value is compared with run history for the DUT to determine whether the KPI value is acceptable. A KPI value is determined to be acceptable in response to the DUT performance shifting from stable to not stable or from not stable to stable. The shift in performance from stable to not stable indicates that the communication rate for that node from the immediately previous testing of the DUT is a maximum communication rate for the node. The shift in performance from not stable to stable indicates that the communication rate for that node in the current testing of the DUT is a maximum communication rate for the node. In some embodiments, the rate control analyzer also considers whether the KPI value is satisfactory based on a designed performance of the network based on information received from a network manager.

In operation 540, a determination is made whether the KPI value is acceptable. In response to a determination that the KPI value is acceptable, the method 500 proceeds to operation 545. In response to a determination the KPI value is not acceptable, the method 500 returns to operation 515.

In operation 545, the testing of the DUT is terminated. The ambassador system transmits an instruction to the orchestrator to cease testing of the DUT. In some embodiments, the ambassador system generates a report using log data from the testing of the DUT. In some embodiments, the report is provided to a network manager. In some embodiments, the ambassador system generates an alert in response to the report indicating that no KPI value that satisfying network design is stable for DUT during the testing. In some embodiments, the alert is similar to the alert discussed with respect to operation 340 (FIG. 3).

One of ordinary skill in the art would understand that additional operations are possible within method 500 in some embodiments. For example, in some embodiments, the method 500 further includes receiving KPI values from other DUTs of a same type to help identify an initial communication rate for testing. In some embodiments, an order of operations of the method 500 is changed. For example, in some embodiments the operation 510 is performed prior to the operation 505 and the simulation graph is received by the rate control analyzer with nodes that contribute to KPI already identified. In some embodiments, at least one operation of the method 500 is omitted. For example, in some embodiments, the operation 530 is omitted and the calculation is integrated into the operation 535.

Utilizing the method 500 helps to improve communication rate for the DUT once the DUT is deployed in the network. As a result, the DUT is more likely to meet network design parameters and improve customer satisfaction with the network.

FIG. 6 is a block diagram of measuring operation 600 of a device under test (DUT), in accordance with some embodiments. The measuring operation 600 is a simplified example of adjusting rate usable to test a DUT by a network testing system. In some embodiments, the measuring operation 600 is usable by the network testing system 100 (FIG. 1) or the network testing system 200 (FIG. 2). In some embodiments, the measuring operation 600 is usable by a network testing system other than the network testing system 100 (FIG. 1) or the network testing system 200 (FIG. 2). In some embodiments, the measuring operation is usable in the method 500 (FIG. 5). In some embodiments, the measuring operation 600 is usable in a method other than the method 500 (FIG. 5).

In operation 610, the rate control analyzer compares a rate of change of registrations attempted, registration failures and registration success values to determine a registration rate KPI. In response to a determination that the DUT performance was stable at the determined registration rate, the rate control analyzer will increase the registration rate in a subsequent test of the DUT. In response to a determination that the DUT performance was not stable at the determined registration rate, the rate control analyzer will decrease the registration rate in a subsequent test of the DUT. For example, in a situation where the registration rate KPI was determined to be 500 attempts/second and the DUT performance was stable, the rate control analyzer will increase the registration rate KPI to 550 attempts/second in a subsequent testing of the DUT, in some embodiments.

In operation 620, the rate control analyzer compares a rate of change of protocol data unit (PDU) session establishment attempted, PDU session establishment failures and PDU session establishment success values to determine a PDU session establishment rate KPI. In response to a determination that the DUT performance was stable at the determined PDU session establishment rate, the rate control analyzer will increase the PDU session establishment rate in a subsequent test of the DUT. In response to a determination that the DUT performance was not stable at the determined PDU session establishment rate, the rate control analyzer will decrease the PDU session establishment rate in a subsequent test of the DUT. For example, in a situation where the PDU session establishment rate KPI was determined to be 100 attempts/second and the DUT performance was not stable, the rate control analyzer will decrease the PDU session establishment rate KPI to 75 attempts/second in a subsequent testing of the DUT, in some embodiments.

In operation 630, the rate control analyzer compares a rate of change of PDU session modifications attempted, PDU session modification failures and PDU session modification success values to determine a PDU session modification rate KPI. In response to a determination that the DUT performance was stable at the determined PDU session modification rate, the rate control analyzer will increase the PDU session modification rate in a subsequent test of the DUT. In response to a determination that the DUT performance was not stable at the determined PDU session modification rate, the rate control analyzer will decrease the PDU session modification rate in a subsequent test of the DUT. For example, in a situation where the PDU session modification rate KPI was determined to be 200 attempts/second and the DUT performance was stable, the rate control analyzer will increase the PDU session modification rate KPI to 220 attempts/second in a subsequent testing of the DUT, in some embodiments.

One of ordinary skill in the art would recognize that the measuring operation 600 including three nodes that impact KPI for the DUT is merely an example. Measuring operations that include more or less than three nodes that impact KPI for the DUT are within the scope of this description.

Figure 7:
FIG. 7 is a block diagram of a network testing system, in accordance with some embodiments.

FIG. 7 is a block diagram of a network testing system 700, in accordance with some embodiments. System 700 includes a hardware processor 702 and a non-transitory, computer readable storage medium 707 encoded with, i.e., storing, the computer program code 706, i.e., a set of executable instructions. Computer readable storage medium 704 is also encoded with instructions 707 for interfacing with external devices for implementing some or all of the operations described with respect to the network testing system 100 (FIG. 1), the network testing system 200 (FIG. 2), the method 300 (FIG. 3), the call graph 400 (FIG. 4), the method 500 (FIG. 5) or the measuring operation 600 (FIG. 6). The processor 702 is electrically coupled to the computer readable storage medium 704 via a bus 708. The processor 702 is also electrically coupled to an I/O interface 710 by bus 708. A network interface 712 is also electrically connected to the processor 702 via bus 708. Network interface 712 is connected to a network 714, so that processor 702 and computer readable storage medium 704 are capable of connecting to external elements via network 714. The processor 702 is configured to execute the computer program code 706 encoded in the computer readable storage medium 704 in order to cause system 700 to be usable for performing a portion or all of the operations as described in the network testing system 100 (FIG. 1), the network testing system 200 (FIG. 2), the method 300 (FIG. 3), the call graph 400 (FIG. 4), the method 500 (FIG. 5) or the measuring operation 600 (FIG. 6).

In some embodiments, the processor 702 is a central processing unit (CPU), a multi-processor, a distributed processing system, an application specific integrated circuit (ASIC), and/or a suitable processing unit.

In some embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 704 includes a compact disk-read only memory (CD-ROM), a compact disk-read/write (CD-R/W), and/or a digital video disc (DVD).

In some embodiments, the storage medium 704 stores the computer program code 706 configured to cause system 700 to perform a portion or all of the operations as described in the network testing system 100 (FIG. 1), the network testing system 200 (FIG. 2), the method 300 (FIG. 3), the call graph 400 (FIG. 4), the method 500 (FIG. 5) or the measuring operation 600 (FIG. 6). In some embodiments, the storage medium 704 also stores information needed for performing a portion or all of the operations as described in the network testing system 100 (FIG. 1), the network testing system 200 (FIG. 2), the method 300 (FIG. 3), the call graph 400 (FIG. 4), the method 500 (FIG. 5) or the measuring operation 600 (FIG. 6) as well as information generated during performing a portion or all of the operations as described in the network testing system 100 (FIG. 1), the network testing system 200 (FIG. 2), the method 300 (FIG. 3), the call graph 400 (FIG. 4), the method 500 (FIG. 5) or the measuring operation 600 (FIG. 6), such as a call graph parameter 716, a run history parameter 718, a KPI value parameter 720, a payload parameter 722 and/or a set of executable instructions to perform the operation of a portion or all of the operations as described in the network testing system 100 (FIG. 1), the network testing system 200 (FIG. 2), the method 300 (FIG. 3), the call graph 400 (FIG. 4), the method 500 (FIG. 5) or the measuring operation 600 (FIG. 6).

In some embodiments, the storage medium 704 stores instructions 707 for interfacing with external devices. The instructions 707 enable processor 702 to generate instructions readable by the external devices to effectively implement a portion or all of the operations as described in the network testing system 100 (FIG. 1), the network testing system 200 (FIG. 2), the method 300 (FIG. 3), the call graph 400 (FIG. 4), the method 500 (FIG. 5) or the measuring operation 600 (FIG. 6).

System 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

System 700 also includes network interface 712 coupled to the processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in the network testing system 100 (FIG. 1), the network testing system 200 (FIG. 2), the method 300 (FIG. 3), the call graph 400 (FIG. 4), the method 500 (FIG. 5) or the measuring operation 600 (FIG. 6) is implemented in two or more systems 700, and information such call graph parameter 716, run history parameter 718, KPI value parameter 720, or payload parameter 722 are exchanged between different systems 700 via network 714.

Supplemental Note 1

A network testing system includes a non-transitory computer readable medium configured to store instructions thereon. The network testing system further includes a processor connected to the non-transitory computer readable medium. The processor is configured to execute the instructions for retrieving a call graph. The processor is configured to execute the instructions for identifying decision branches within the call graph. The processor is configured to execute the instructions for generating a valid request payload for each of the decision branches. The processor is configured to execute the instructions for generating an invalid request payload for each of the decision branches. The processor is configured to execute the instructions for instructing an orchestrator to test a device under test (DUT) using each of the valid request payload and the invalid request payload. The processor is configured to execute the instructions for comparing responses received from the DUT to each of the valid request payload and the invalid request payload with expected responses. The processor is configured to execute the instructions for determining that the DUT includes a failure in response to a determination that any of the responses received from the DUT fail to match a corresponding expected response of the expected responses.

Supplemental Note 2

In some embodiments, the processor of Supplemental Note 1 is further configured to execute the instructions for: generating the valid request payload based on a communication protocol for the DUT; and generating the invalid request payload based on the communication protocol for the DUT.

Supplemental Note 3

In some embodiments, the processor of any of Supplemental Notes 1 and 2 is further configured to execute the instructions for: determining that the DUT operates properly in response to a determination that all of the responses received from the DUT match each corresponding expected response of the expected responses.

Supplemental Note 4

In some embodiments, the processor of any of Supplemental Notes 1-3 is further configured to execute the instructions for: retrieving a run history for testing of the DUT; identifying a node of the call graph that contributes to a key performance indicator (KPI) of the DUT; adjusting a communication rate for the node; and instructing the orchestrator to test the DUT using the adjusted communication rate.

Supplemental Note 5

In some embodiments, the processor of any of Supplemental Notes 1-4 is further configured to execute the instructions for: adjusting the communication rate to increase the communication rate in response to the run history for testing of the DUT indicating that a previous run of the DUT indicated stability by the DUT.

Supplemental Note 6

In some embodiments, the processor any of Supplemental Notes 1-5 is further configured to execute the instructions for:

adjusting the communication rate to decrease the communication rate in response to the run history for testing of the DUT indicating that a previous run of the DUT indicated instability by the DUT.

Supplemental Note 7

In some embodiments, the processor any of Supplemental Notes 1-7 is further configured to execute the instructions for: generating an alert in response to the determination that the DUT has a failure; and instructing a transmitter to transmit the alert to a network manager.

Supplemental Note 8

A network testing method includes retrieving a call graph. The method further includes identifying decision branches within the call graph. The method further includes generating a valid request payload for each of the decision branches. The method further includes generating an invalid request payload for each of the decision branches. The method further includes instructing an orchestrator to test a device under test (DUT) using each of the valid request payload and the invalid request payload. The method further includes comparing responses received from the DUT to each of the valid request payload and the invalid request payload with expected responses. The method further includes determining that the DUT includes a failure in response to a determination that any of the responses received from the DUT fail to match a corresponding expected response of the expected responses.

Supplemental Note 9

The method of Supplemental Note 8, wherein generating the valid request payload comprises generating the valid request payload based on a communication protocol for the DUT, and generating the invalid request payload comprises generating the invalid request payload based on the communication protocol for the DUT.

Supplemental Note 10

The method of Supplemental Note 8 or 9 further comprising: determining that the DUT operates properly in response to a determination that all of the responses received from the DUT match each corresponding expected response of the expected responses.

Supplemental Note 11

The method of any of Supplemental Notes 8-10 further comprising: retrieving a run history for testing of the DUT; identifying a node of the call graph that contributes to a key performance indicator (KPI) of the DUT; adjusting a communication rate for the node; and instructing the orchestrator to test the DUT using the adjusted communication rate.

Supplemental Note 12

The method of any of Supplemental Notes 8-11, wherein adjusting the communication rate comprises increasing the communication rate in response to the run history for testing of the DUT indicating that a previous run of the DUT indicated stability by the DUT.

Supplemental Note 13

The method of any of Supplemental Notes 8-12, wherein adjusting the communication rate comprises decreasing the communication rate in response to the run history for testing of the DUT indicating that a previous run of the DUT indicated instability by the DUT.

Supplemental Note 14

The method of any of Supplemental Notes 8-13, further comprising: generating an alert in response to the determination that the DUT has a failure; and transmitting the alert to a network manager.

Supplemental Note 15

A non-transitory computer readable medium configured to store instructions thereon. The instructions are configured to cause a processor to perform operations comprising retrieving a call graph. The instructions are configured to cause a processor to perform operations comprising identifying decision branches within the call graph. The instructions are configured to cause a processor to perform operations comprising generating a valid request payload for each of the decision branches. The instructions are configured to cause a processor to perform operations comprising generating an invalid request payload for each of the decision branches. The instructions are configured to cause a processor to perform operations comprising instructing an orchestrator to test a device under test (DUT) using each of the valid request payload and the invalid request payload. The instructions are configured to cause a processor to perform operations comprising comparing responses received from the DUT to each of the valid request payload and the invalid request payload with expected responses. The instructions are configured to cause a processor to perform operations comprising determining that the DUT includes a failure in response to a determination that any of the responses received from the DUT fail to match a corresponding expected response of the expected responses.

Supplemental Note 16

The non-transitory computer readable medium of Supplemental Note 15, wherein the instructions are configured to cause a processor to perform operations comprising: generating the valid request payload based on a communication protocol for the DUT; and generating the invalid request payload based on the communication protocol for the DUT.

Supplemental Note 16

The non-transitory computer readable medium of any of Supplement Note 15 or 16, wherein the instructions are configured to cause a processor to perform operations comprising: determining that the DUT operates properly in response to a determination that all of the responses received from the DUT match each corresponding expected response of the expected responses.

Supplemental Note 18

The non-transitory computer readable medium of any of Supplemental Notes 15-17, wherein the instructions are configured to cause a processor to perform operations comprising: retrieving a run history for testing of the DUT; identifying a node of the call graph that contributes to a key performance indicator (KPI) of the DUT; adjusting a communication rate for the node; and instructing the orchestrator to test the DUT using the adjusted communication rate.

Supplemental Note 19

The non-transitory computer readable medium of any of Supplemental Notes 15-18, wherein the instructions are configured to cause a processor to perform operations comprising: adjusting the communication rate to increase the communication rate in response to the run history for testing of the DUT indicating that a previous run of the DUT indicated stability by the DUT.

Supplemental Note 20

The non-transitory computer readable medium of any of Supplemental Notes 15-19, wherein the instructions are configured to cause a processor to perform operations comprising: adjusting the communication rate to decrease the communication rate in response to the run history for testing of the DUT indicating that a previous run of the DUT indicated instability by the DUT.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A network testing system comprising:
a non-transitory computer readable medium configured to store instructions thereon; and
a processor connected to the non-transitory computer readable medium, wherein the processor is configured to execute the instructions for:
retrieving a call graph;
identifying decision branches within the call graph;
generating a valid request payload for each of the decision branches;
generating an invalid request payload for each of the decision branches;
instructing an orchestrator, for each of the decision branches, to test a device under test (DUT) using each of the valid request payload and the invalid request payload;
for each of the decision branches, comparing responses received from the DUT to each of the valid request payload and the invalid request payload with expected responses; and
determining that the DUT includes a failure in response to a determination that any of the responses received from the DUT fail to match a corresponding expected response of the expected responses.

2. The network testing system of claim 1, wherein the processor is further configured to execute the instructions for:
generating the valid request payload based on a communication protocol for the DUT; and
generating the invalid request payload based on the communication protocol for the DUT.

3. The network testing system of claim 1, wherein the processor is further configured to execute the instructions for:
determining that the DUT operates properly in response to a determination that all of the responses received from the DUT match each corresponding expected response of the expected responses.

4. The network testing system of claim 1, wherein the processor is further configured to execute the instructions for:
retrieving a run history for testing of the DUT;
identifying a node of the call graph that contributes to a key performance indicator (KPI) of the DUT;
adjusting a communication rate for the node; and
instructing the orchestrator to test the DUT using the adjusted communication rate.

5. The network testing system of claim 4, wherein the processor is further configured to execute the instructions for:
adjusting the communication rate to increase the communication rate in response to the run history for testing of the DUT indicating that a previous run of the DUT indicated stability by the DUT.

6. The network testing system of claim 4, wherein the processor is further configured to execute the instructions for:
adjusting the communication rate to decrease the communication rate in response to the run history for testing of the DUT indicating that a previous run of the DUT indicated instability by the DUT.

7. The network testing system of claim 1, wherein the processor is further configured to execute the instructions for:
generating an alert in response to the determination that the DUT has a failure; and

21 instructing a transmitter to transmit the alert to a network manager.

8. A network testing method, the method comprising:

retrieving a call graph;

identifying decision branches within the call graph;

generating a valid request payload for each of the decision branches;

generating an invalid request payload for each of the decision branches;

instructing an orchestrator, for each of the decision branches, to test a device under test (DUT) using each of the valid request payload and the invalid request payload;

for each of the decision branches, comparing responses received from the DUT to each of the valid request payload and the invalid request payload with expected responses; and determining that the DUT includes a failure in response to a determination that any of the responses received from the DUT fail to match a corresponding expected response of the expected responses.

9. The network testing method of claim 8, wherein generating the valid request payload comprises generating the valid request payload based on a communication protocol for the DUT, and generating the invalid request payload comprises generating the invalid request payload based on the communication protocol for the DUT.

10. The network testing method of claim 8, further comprising:

determining that the DUT operates properly in response to a determination that all of the responses received from the DUT match each corresponding expected response of the expected responses.

11. The network testing method of claim 8, further comprising:

retrieving a run history for testing of the DUT;

identifying a node of the call graph that contributes to a key performance indicator (KPI) of the DUT;

adjusting a communication rate for the node; and instructing the orchestrator to test the DUT using the adjusted communication rate.

12. The network testing method of claim 11, wherein adjusting the communication rate comprises increasing the communication rate in response to the run history for testing of the DUT indicating that a previous run of the DUT indicated stability by the DUT.

13. The network testing method of claim 11, wherein adjusting the communication rate comprises decreasing the communication rate in response to the run history for testing of the DUT indicating that a previous run of the DUT indicated instability by the DUT.

14. The network testing method of claim 8, further comprising generating an alert in response to the determination that the DUT has a failure; and transmitting the alert to a network manager.

15. A non-transitory computer readable medium configured to store instructions thereon, wherein the instructions are configured to cause a processor to perform operations comprising:

22 retrieving a call graph;

identifying decision branches within the call graph;

generating a valid request payload for each of the decision branches;

generating an invalid request payload for each of the decision branches;

instructing an orchestrator, for each of the decision branches, to test a device under test (DUT) using each of the valid request payload and the invalid request payload;

for each of the decision branches, comparing responses received from the DUT to each of the valid request payload and the invalid request payload with expected responses; and determining that the DUT includes a failure in response to a determination that any of the responses received from the DUT fail to match a corresponding expected response of the expected responses.

16. The non-transitory computer readable medium of claim 15, wherein the instructions are configured to cause a processor to perform operations comprising:

generating the valid request payload based on a communication protocol for the DUT; and generating the invalid request payload based on the communication protocol for the DUT.

17. The non-transitory computer readable medium of claim 15, wherein the instructions are configured to cause a processor to perform operations comprising:

determining that the DUT operates properly in response to a determination that all of the responses received from the DUT match each corresponding expected response of the expected responses.

18. The non-transitory computer readable medium of claim 15, wherein the instructions are configured to cause a processor to perform operations comprising:

retrieving a run history for testing of the DUT;

identifying a node of the call graph that contributes to a key performance indicator (KPI) of the DUT;

adjusting a communication rate for the node; and instructing the orchestrator to test the DUT using the adjusted communication rate.

19. The non-transitory computer readable medium of claim 18, wherein the instructions are configured to cause a processor to perform operations comprising:

adjusting the communication rate to increase the communication rate in response to the run history for testing of the DUT indicating that a previous run of the DUT indicated stability by the DUT.

20. The non-transitory computer readable medium of claim 18, wherein the instructions are configured to cause a processor to perform operations comprising:

adjusting the communication rate to decrease the communication rate in response to the run history for testing of the DUT indicating that a previous run of the DUT indicated instability by the DUT.

* * * * *